United States Patent Office 3,338,974
Patented Aug. 29, 1967

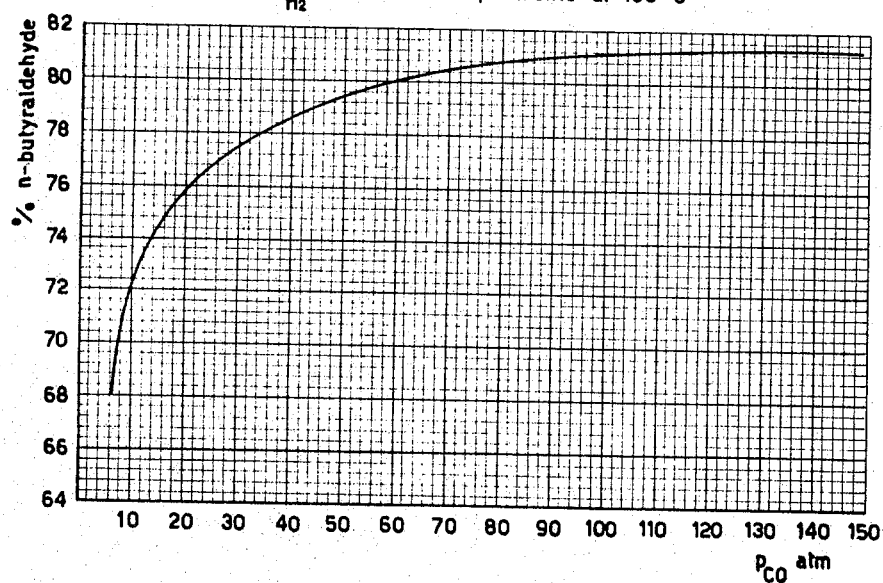

3,338,974
PROCESS FOR PREPARING ALDEHYDES BY THE HYDROFORMYLATION OF OLEFINS
Franco Piacenti and Piero Pino, Pisa, Italy, assignors to Montecatini Edison S.p.A., Milan, Italy
Continuation of application Ser. No. 171,727, Feb. 7, 1962. This application Apr. 13, 1966, Ser. No. 542,426
Claims priority, application Italy, Feb. 8, 1961, 2,296/61
12 Claims. (Cl. 260—604)

This is a continuation of Ser. No. 171,727, filed Feb. 7, 1962, now abandoned.

The present invention relates to certain improvements in the process for preparing aldehydes by the hydroformylation of olefins.

It is known that upon reacting an olefin possessing more than 2 carbon atoms with carbon monoxide and hydrogen, there is generally obtained a mixture of at least two aldehydes, as shown by the following:

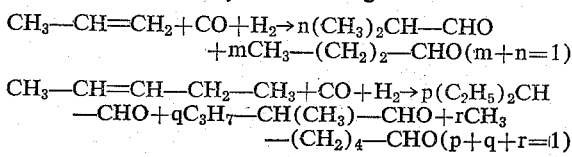

$$CH_3-CH=CH_2+CO+H_2 \rightarrow n(CH_3)_2CH-CHO$$
$$+mCH_3-(CH_2)_2-CHO (m+n=1)$$

$$CH_3-CH=CH-CH_2-CH_3+CO+H_2 \rightarrow p(C_2H_5)_2CH$$
$$-CHO+qC_3H_7-CH(CH_3)-CHO+rCH_3$$
$$-(CH_2)_4-CHO (p+q+r=1)$$

From a practical point of view, this production of a mixture of aldehydes represents a serious inconvenience, particularly when one or more of the aldehydes in the mixture have no significant commerical use.

Various methods have been proposed in order to vary the weight ratios between the isomeric aldehydes produced, such as, the use of high total pressures, different temperatures, particular solvents, or the recycle of one or more reaction products. All these methods, however, possess considerable inconveniences either from a technological point of view or due to undesirable reaction rates or, finally because of the production of secondary reaction products, more particularly, the production of large amounts of aldehyde condensation products.

An object of the present invention is therefore to provide a process whereby it is possible to vary the composition of the reaction products obtained by the hydroformylation of aliphatic olefins having at least 3 carbon atoms without substantially varying the total pressure and the working temperature.

Other objects and advantages of the present invention will become hereinafter apparent.

Applicants have surprisingly found that, temperature, catalyst and solvent being the same, the isomeric composition of the aldehydes produced, depends on the partial pressure of carbon monoxide.

High proportions of straight-chain isomers are therefore obtained by maintaing CO partial pressure which, during the reaction, do not fall below 100 to 150 atmospheres, when operating at temperatures of 100–110° C. (FIG. 1).

Total pressures from 170 atms. upwards may be used and temperatures from 90 to 120° C.

Upon decreasing the CO partial pressure below 70–80 atms., the proportion of alpha-alkyl substituted aldehydes increases rapidly. Thus, for example in the case of the hydroformylation of propylene, when operating under CO partial pressures of 1–2 atms., the production of iso-butyraldehyde prevails over that of n-butyraldehyde.

These operating conditions, i.e., 1–2 atms. of CO, are obtained in the laboratory by using stoichiometric amounts of $Co_4(CO)_{12}$ as the supplier of CO. In this case, by reacting 7.5 g. of propylene with 8 g. of $Co_4(CO)_{12}$ dissolved in 50 cm.³ of toluene in the presence of 94 atms. of $H_2$, a mixture of butyraldehydes containing 53.5% of iso-butyraldehyde are obtained.

The hydrogen partial pressure exerts an influence in the same general manner as the carbon monoxide, but its effect is much less significant on the isomeric composition of the reaction products. A minimum hydrogen partial pressure of 70 atms. should be used.

It is therefore possible, according to the present invention, to vary the ratio between the isomeric aldehydes produced, without resorting to operation under very high pressures, by simply varying the $p_{CO}/p_{H_2}$ ratio.

More particularly, as shown in the following Table 1, high yields of normal aldehydes can be obtained by operating with $p_{CO}/p_{H_2}$ ratios above 1, for example, ratios of 1.3 to 1.5 or even higher. This is in contrast with the $p_{CO}/p_{H_2}$ ratios below 1, which are suggested by the prior art.

Moreover, it also been found that, if the isomeric composition of the reaction products is to remain unaltered upon raising the temperature, the carbon monoxide partial pressure under which the reaction is carried out must be increased correspondingly.

The process of the present invention can in fact be generally applied to all olefinic monomers which yield at least 2 isomeric compounds upon hydroformylation. Thus, for example, propylene, butene, pentene, hexene, 2-ethyl-hexene-1,3-methylpentene-1, etc., may be employed as the olefin feed. Aromatic, aliphatic and cycloaliphatic hydrocarbons or mixtures thereof are suitable for use as solvents in applicants' instant process to obtain high proportions of the straight chain isomer, while oxygen containing solvents such as alcohols, ethers etc. are suitable to obtain high yields in branched chain isomers. In general, the temperature and pressure conditions and the solvents suitable for use in the oxo process for the production of alcohols, aldehydes and the like, can be employed with the process of the present invention.

The following examples, whose results are reported in Table 1, illustrate some particular features of the present invention. It is is to be understood that the present invention is not limited to the particular temperatures, pressures and solvent indicated in these examples, but also includes suitable variations which would be apparent to one skilled in the art.

TABLE 1.—SYNTHESIS OF ALDEHYDES FROM OLEFINS, CO AND $H_2$, CARRIED OUT IN EACH CASE UNDER THE SAME TOTAL (CONSTANT) PRESSURE AND UNDER DIFFERENT PARTIAL PRESSURES OF CO AND $H_2$

[Total P=245 atm. at 108° C. ± 1°; Solvent=100 g. of toluene]

| Olefin | Olefin, g. | Catalyst [Co(CO)$_4$]$_2$, g. | $P_{CO}$ atm. | $P_{H_2}$ atm. | Time | Percent conversion | Percent residue total aldehydes | Percent n-aldehyde/total aldehydes | Percent i-aldehyde/total aldehydes | n-aldehyde/i-aldehyde |
|---|---|---|---|---|---|---|---|---|---|---|
| Propylene | 28 | 1 | 148 | 100 | 2 hrs | 64.5 | 2.5 | 81.1 | 18.9 | 4.3 |
| Do | 24 | 0.5 | 16 | 225 | 50 mins | 71.8 | 2.9 | 72.05 | 27.95 | 2.58 |
| Do | 24 | 0.5 | 5 | 235 | 1½ hrs | 71.3 | 2.1 | 68.2 | 31.8 | 2.15 |
| Butene * | 28 | 1 | 140 | 108 | 1 hr | 53 | 3.5 | 79.2 | 20.8 | 3.8 |
| Do * | 29 | 1 | 8.5 | 234 | 70 mins | 66.6 | 2.6 | 65.3 | 34.7 | 1.88 |

* The mixture of butenes used contains 85.5% butene-1; 7.25% butene-2 cis and 6.85% butene-2 trans.

Unless otherwise indicated all parts and proportions are by weight.

The pressure is given as gauge values.

*Example 1*

Into a 485 cc. stainless steel (18% Ni and 8% Cr) autoclave, which is perfectly dry, and from which air has been removed by a suction pump, a solution of 1.0 g. of dicobalt octacarbonyl in 100 g. toluene is introduced by suction and then 28 g. of propylene is added. Carbon monoxide is then introduced up to a pressure of 25 atms. The autoclave, mounted on a device which makes it possibel to oscillate it with a frequency of about 36 oscillations per minute, is agitated and heated to the temperature of 108°±1° C. As soon as the temperature is stabilized, carbon monoxide is added up to a pressure of 55 atms. and then CO and $H_2$ in the molar ratio of (1:1), up to a pressure of 255 atms. The autoclave is fed continuously with a mixture of CO and $H_2$ (1:1) taken from a high pressure tank, so as to maintain the partial pressures of both gases substantially constant during the whole course of the reaction.

In order to take into account the pressure drop due to the disappearance of reacted propylene, the total pressure is slowly reduced by 5 atms. during the reaction. The final total pressure at the reaction temperature is about 250 atms. After 2 hours, when about 20 N liters of the CO and $H_2$ mixtures have been absorbed, the reaction is stopped by quickly cooling the autoclave. From the composition of the residual gases, determined by absorption in an Orsat apparatus and from the total pressure at the reaction temperature, it is calculated that the partial pressures of CO and $H_2$ during the reaction is as follows:

$p_{CO}=148$ atms. and $p_{H_2}=100$ atms.
140 g. of liquid product are discharged.
50 g. of the crude reaction product, subjected to distillation under atmospheric pressure yields 49.6 g. of distillate having a boiling point lower than 120° C. and 0.4 g. of a residue.

The total residue, after subtracting the weight of the cobalt present, is equal to 0.78 g.

A quantitative determination of the carbonyl compounds present, which is carried out on the reaction product employing hydroxylamine hydrochloride (Siggia-Quantitative Organic Analysis via Functional Groups—J. Wiley and Sons, New York, 1954, page 28), shows the presence of 0.434 mol of carbonyl compounds, thus corresponding to a conversion of 65% of the charged propylene.

The n-butyric/iso-butyric aldehyde ratio is determined by vapor phase chromatography, using a vapor Fractometer, 154 B of the Perkin-Elmer Corporation, equipped with a 2-meter long column having a fixed phase of dinonylphthalate on celite, and operating at 80° C., with helium as carrier gas.

The n-butyric/iso-butyric aldehyde ratio is found to be 4.3, thereby corresponding to a proportion of 81.1% of n-butyraldehyde and 18.9% of isobutyraldehyde based on the total of the two aldehydes.

*Example 2*

Using the same autoclave as that described in Example 1 and the same technique, there is added to said autoclave a solution of 0.5 g. of dicobalt octacarbonyl in 100 g. of toluene, 24 g. of propylene, and carbon monoxide up to a pressure of 8 atms. Agitation is started and the autoclave is heated to 108±1° C. $H_2$ is then added up to a pressure of 250 atms. The partial pressure of carbon monoxide and of hydrogen in the autoclave is kept constant by continuously feeding CO and $H_2$ from a high-pressure reservoir. In order to take into account the pressure drop due to the reacted propylene, the total pressure during the reaction is not kept rigorously constant, but is decreased continuously up to a total drop of 5 atms. The final pressure at the reaction temperature is about 245 atms. 50 minutes after the commencement of the reaction, when 19 normal liters of gas are absorbed, the reaction is stopped by quickly cooling the autoclave.

Based on the composition of the final gases and from the final total reaction pressure, it is found that the partial pressures of carbon monoxide and of hydrogen during the reaction are:

$p_{CO}=16$ atms. and $p_{H_2}=225$ atms.
135 g. of liquid product are obtained.

60 g. of the reaction product, distilled under atmospheric pressure, give 64.55 g. of a product having a boiling point lower than 120° C. and 0.45 g. of residue.

The total residue, after subtracting the weight of the cobalt present, is equal to 0.84 g.

A quantitative determination of the carbonyl compounds, carried out on the reaction product, shows the presence of 0.410 mol of said compounds, thus corresponding to a conversion of 71.8% of the charged propylene.

The n-butyric/iso-butyric aldehyde ratio, determined by vapor phase chromatography, is 2.58 thereby corresponding to a proportion of 72.05% of n-butyraldehyde and 27.95% of iso-butyraldehyde with respect to the total of both aldehydes.

*Example 3*

Employing the same autoclave as described in Example 1 and with the same technique, 0.5 g. of dicobalt octacarbonyl dissolved in 100 g. of toluene, 24 g. of propylene, and carbon monoxide up to a pressure of 6 atms., are introduced.

Agitation is started and $H_2$ is introduced into the autoclave, which is heated to 108±1° C., up to a pressure of 260 atms. as soon as the temperature is stabilized. When the pressure decreases to 250 atms., the autoclave is continuously fed with CO and $H_2$ (1:1) to maintain the partial pressures of both gases constant. In order to take into account the propylene consumed during the reaction, the total pressure is gradually reduced by 5 atms. The final pressure is 245 atms.

The reaction is stopped by quickly cooling the autoclave 90 minutes, after commencement of reaction, when about 18 N liters of gas are absorbed.

From the analysis of the residual gases and from the final pressure at the reaction temperatures, it is calculated that the partial pressure of CO and $H_2$ during the reaction are:

$p_{CO}=5$ atms. and $p_{H_2}=235$ atms.
135 g. of liquid product are obtained.

By distilling 57.5 g. of reaction product under atmospheric pressure, a residue of 0.35 g. is obtained from which it is calculated that the total distillation residue (after subtracting the weight of the cobalt present) is 0.63 g.

The quantitative determination of the carbonyl compounds carried out on the crude reaction product shows the presence of 0.405 mol of said compounds, thereby corresponding to a 71.3% conversion of the charged propylene.

The n-butyric/iso-butyric aldehyde ratio, determined by vapor phase chromatography, is 2.15, corresponding to a proportion of 68.2% of n-butyraldehyde and 31.8% of iso-butyraldehyde based on the total of both aldehydes.

*Example 4*

Using the same autoclave and the same technique as described in Example 1, there is introduced the following: 1 g. of dicobalt octacarbonyl dissolved in 100 g. of toluene, 28 g. of a mixture of normal butenes (85.5% butene-1, 2.75% cis-butene-2 and 6.85% trans butene-2), and carbon monoxide up to a pressure of about 30 atms.

Agitation is started and the autoclave is heated to 108°±1° C. CO is added up to a pressure of 5 atms.

and then a mixture of CO and $H_2$ (1:1) up to 250 atms. is supplied. The partial pressures of CO and $H_2$ are kept constant by continuously feeding the CO and $H_2$ (1:1) into the autoclave.

After 60 minutes, the reaction is stopped by quickly cooling the autoclave, when about 13 N liters of gas are absorbed.

The partial pressures of CO and $H_2$, calculated from the analysis of the residual gases and from the reaction pressure is $p_{CO}$=140 atms. and $p_{H_2}$=108 atms.

133 g. of liquid product are obtained.

By distilling 57 g. of the reaction product, a residue of 0.5 g. is obtained from which it is thereby calculated that the total distillation residue, after subtracting the weight of the cobalt present, is 0.80 g.

A quanitative determination for the carbonyl groups, carried out on the reaction product, shows the presence of 0.265 mol of aldehydes, corresponding to a conversion of about 53% of the charged butene. Th n-valeraldehyde/iso-valeraldehyde ratio, determined by vapor phase chromatography under the conditions described in Example 1, but at the temperature of 105° C., is 3.8. This corresponds to a proportion of 79.2% of n-valeraldehyde and 20.8% of iso-valeraldehyde.

*Example 5*

Using the same autoclave and the same technique as described in Example 1, there is introduced 1 g. of dicobalt octacarbonyl dissolved in 100 g. of toluene, 29 g. of a mixture of butenes and carbon monoxide up to a pressure of 5 atms. Agitation is started and the autoclave is heated to 108°±1° C. When the temperature is stabilized, hydrogen is introduced up to a pressure of 260 atms. As soon as the pressure drops to 250 atms., the partial pressures of CO and $H_2$ are maintained constant by continuously feeding a mixture of CO and $H_2$ (1:1) into the autoclave.

About 70 minutes after its commencement, the reaction is stopped by quickly cooling the autoclave, when about 15 N liters of gas are absorbed.

The partial pressures of CO and $H_2$ during the reaction, calculated from the analysis of the final gases and from the total pressure during the reaction, are:

$p_{CO}$=8.5 atms. and $p_{H_2}$=234 atms.

136.2 g. of liquid product are obtained.

By distilling 60 g. of the reaction product, there is obtained a residue of 0.5 g. from which it is calculated that the distillation residue, after subtracting the weight of the cobalt present, is equal to 0.78 g.

A quantitative determination of the carbonyl groups, which is carried out on the reaction product, shows the presence of 0.345 mol of aldehydes, corresponding to a 66.6% conversion of the butane.

The n-valeraldehyde/iso-valeraldehyde ratio, determined by vapor phase chromatography is 1.88, corresponding to a proportion of 65.3% of n-valeraldehyde and 34.7% of iso-valeraldehyde, with respect to the total amount of the two aldehydes.

In addition to the cobalt carbonyl shown as the catalyst in the above examples, other carbonyl compounds of cobalt and carbonyl compounds of other metals belonging to Group VIII of the Mendeleeff Periodic Table may be used in the process of the present invention.

Many variations and modifications may, of course, be practised without departing from the spirit of the present invention.

Having thus described the present invention, what we desired to secure and claim by Letters Patent is:

1. A process for preparing a mixture of isomeric aliphatic aldehydes containing at least four carbon atoms in which the straight chain isomers prevail over the branched chain isomers comprising contacting a linear olefin having at least three carbon atoms with CO and $H_2$ in the presence of $[Co(CO)_4]_2$ with a total pressure of at least 170 atmospheres at temperatures of from 90° to 120° C., with a CO partial pressure between 100 and 150 atmospheres, and a hydrogen partial pressure of at least 70 atmospheres, with a CO to hydrogen partial pressure ratio of above 1.

2. A process according to claim 1, in which the CO to hydrogen partial pressure ratio is from 1.3 to 1.5.

3. A process according to claim 1, in which a straight to branched chain isomer ratio of at least 3.8 is obtained.

4. A process according to claim 1, in which the linear olefin is propylene, and a mixture of butyraldehydes containing more than 80% by weight of normal-butyraldehyde is obtained.

5. A process according to claim 1, in which the linear olefin is butene and a mixture of valeraldehydes containing more than 79% by weight of normal-valeraldehyde is obtained.

6. A process for preparing a mixture of isomeric aliphatic aldehydes containing at least four carbon atoms containing a large proportion of branched isomers comprising contacting a linear olefin having at least three carbon atoms with CO and $H_2$ in the presence of $[Co(CO)_4]_2$ at a temperature of from 90° to 120° C., with a CO partial pressure of below 80 atmospheres, and a hydrogen partial pressure of at least 70 atmospheres during the reaction.

7. A process according to claim 6, in which the CO partial pressure is from 1 to 2 atmospheres.

8. A process according to claim 7, in which the straight to branched chain isomer ratio obtained is lower than 1.

9. A process according to claim 7, in which the hydrogen partial pressure is about 94 atmospheres.

10. A process according to claim 8, in which the partial pressure of hydrogen is about 94 atmospheres.

11. A process according to claim 10, in which the olefin used is propylene.

12. A process according to claim 7, in which the CO pressure is obtained by using $Co_4(CO)_{12}$ as supplier of CO.

No references cited.

LEON ZITVER, *Primary Examiner.*

H. LILES, *Assistant Examiner.*